(12) United States Patent
Skikun et al.

(10) Patent No.: US 11,001,228 B2
(45) Date of Patent: May 11, 2021

(54) METHODS AND APPARATUS TO FACILITATE EQUIPMENT STATUS VERIFICATION IN A STORAGE DEVICE

(71) Applicant: Ford Global Technologies, LLC, Dearborn, MI (US)

(72) Inventors: Steven T. Skikun, Commerce Township, MI (US); Robert S. Kern, Eastpointe, MI (US); Arie Groeneveld, Bloomfield Hills, MI (US); Frank J. Desjarlais, Canton, MI (US); Jon Ohland, Northville, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 16/146,062

(22) Filed: Sep. 28, 2018

(65) Prior Publication Data

US 2020/0101937 A1   Apr. 2, 2020

(51) Int. Cl.
| | |
|---|---|
| B60R 25/102 | (2013.01) |
| G08B 13/14 | (2006.01) |
| F41A 23/26 | (2006.01) |
| F41A 23/00 | (2006.01) |
| B60R 11/00 | (2006.01) |

(52) U.S. Cl.
CPC .......... B60R 25/102 (2013.01); F41A 23/005 (2013.01); F41A 23/26 (2013.01); G08B 13/14 (2013.01); *B60R 2011/0098* (2013.01)

(58) Field of Classification Search
CPC ...................... B60R 25/102; B60R 2011/0098
See application file for complete search history.

(56) References Cited

U.S. PATENT DOCUMENTS

| | | | | |
|---|---|---|---|---|
| 4,702,094 A | * | 10/1987 | Peterson | E05B 47/0603 180/289 |
| 5,808,375 A | * | 9/1998 | Armbruster | B60R 16/0234 180/287 |
| 5,816,546 A | * | 10/1998 | Miller | B60R 7/14 248/205.1 |
| 7,200,965 B2 | * | 4/2007 | Vor Keller | E05B 47/0603 224/244 |
| 8,115,620 B2 | * | 2/2012 | Breed | G01F 23/20 340/431 |
| 8,752,745 B2 | * | 6/2014 | Bond | B62J 9/001 206/317 |
| 9,221,400 B1 | * | 12/2015 | Setina | B60R 5/04 |
| 9,656,629 B2 | * | 5/2017 | Groeneveld | B60R 25/20 |
| 2002/0121967 A1 | * | 9/2002 | Bowen | B60Q 1/52 340/425.5 |

(Continued)

*Primary Examiner* — Qutbuddin Ghulamali
(74) *Attorney, Agent, or Firm* — Frank Lollo; Eversheds Sutherland (US) LLP

(57) ABSTRACT

Methods and apparatus are disclosed to facilitate equipment status verification in a storage device. An example vehicle comprises: an equipment rack, a processor and memory, and a display. The equipment rack includes sensors to generate presence and securement information. The processor and memory are in communication with the sensors and are configured to: determine a presence status of an object assigned to the equipment rack, determine a securement status of the object in the equipment rack, and display a report of the presence and securement statuses via the display.

14 Claims, 8 Drawing Sheets

(56) References Cited

U.S. PATENT DOCUMENTS

| | | | |
|---|---|---|---|
| 2007/0050271 A1* | 3/2007 | Ufford | G06Q 10/087 705/28 |
| 2014/0176363 A1* | 6/2014 | Lam | G01S 19/14 342/357.39 |
| 2017/0074617 A1* | 3/2017 | Stewart | F41C 33/029 |
| 2017/0162030 A1 | 6/2017 | Rajnath | |
| 2017/0337437 A1 | 11/2017 | Kanagaraj et al. | |

* cited by examiner

METHODS AND APPARATUS TO FACILITATE EQUIPMENT STATUS VERIFICATION IN A STORAGE DEVICE

TECHNICAL FIELD

The present disclosure generally relates to automated vehicle features and, more specifically, methods and apparatus to facilitate equipment status verification in a storage device.

BACKGROUND

In recent years, vehicles have been equipped with automated vehicle features such as seat belt buckling reminders, passenger weight detection, mirror dimming, headlamp illumination, park brake engagement reminders, rain-detecting windshield wipers, door opening and locking status, etc. Automated vehicle features often make vehicles more enjoyable to drive, remind drivers to use their seat belts, and/or assist drivers in driving vigilantly. Information from automated vehicle safety features is often presented to a driver via an interface of a vehicle.

SUMMARY

The appended claims define this application. The present disclosure summarizes aspects of the embodiments and should not be used to limit the claims. Other implementations are contemplated in accordance with the techniques described herein, as will be apparent to one having ordinary skill in the art upon examination of the following drawings and detailed description, and these implementations are intended to be within the scope of this application.

An example vehicle is disclosed. The vehicle comprises: an equipment rack, a processor and memory, and a display. The equipment rack includes sensors to generate presence and securement information. The processor and memory are in communication with the sensors and are configured to: determine a presence status of an object assigned to the equipment rack, determine a securement status of the object in the equipment rack, and display a report of the presence and securement statuses via the display.

An example method is disclosed. The method comprises: determining, with a processor, a presence status of an object assigned to an equipment rack; determining, with the processor, a securement status of the object in the equipment rack; and displaying, with a display, a report of the presence and securement statuses.

An example system is disclosed. The system comprises: a network, a mobile device, a central facility, and a vehicle. The a mobile device and the central facility are in communication with the network. The vehicle comprises: a transceiver, an equipment rack, an infotainment head unit (IHU), and a processor and memory. The transceiver is in communication with the network. The equipment rack includes sensors to generate presence and securement information. The processor and memory are in communication with the sensors, the transceiver, and the IHU and are configured to: determine a presence status of an object assigned to the equipment rack, determine a securement status of the object in the equipment rack, display a report of the presence and securement statuses via the IHU, and transmit the report to one or more of the mobile device and the central facility via the network.

BRIEF DESCRIPTION OF THE DRAWINGS

For a better understanding of the invention, reference may be made to embodiments shown in the following drawings. The components in the drawings are not necessarily to scale and related elements may be omitted, or in some instances proportions may have been exaggerated, so as to emphasize and clearly illustrate the novel features described herein. In addition, system components can be variously arranged, as known in the art. Further, in the drawings, like reference numerals designate corresponding parts throughout the several views.

DETAILED DESCRIPTION OF EXAMPLE EMBODIMENTS

Figure 1:
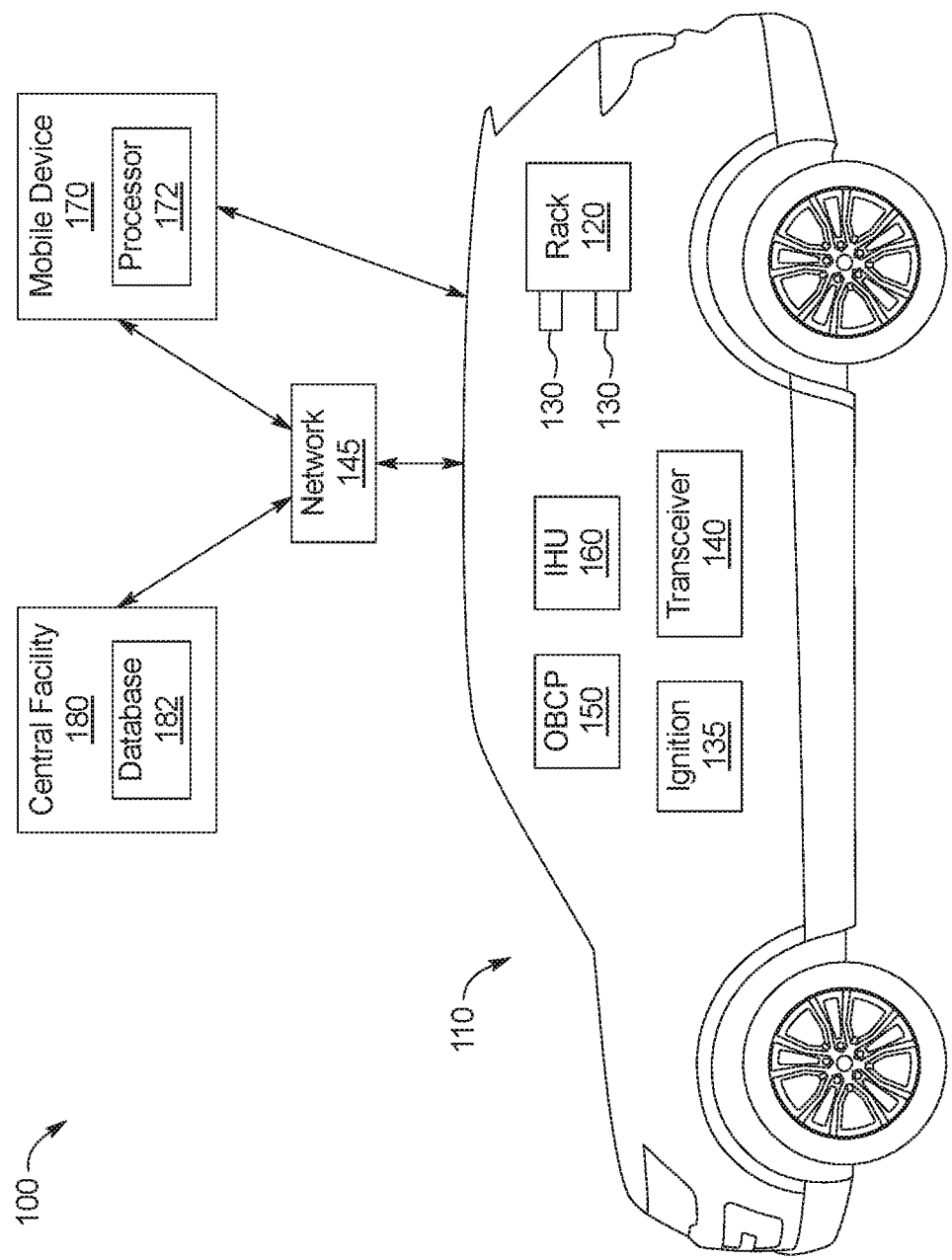
FIG. 1 is a side schematic view of a vehicle operating in accordance with the teachings of this disclosure in an environment.

While the invention may be embodied in various forms, there are shown in the drawings, and will hereinafter be described, some exemplary and non-limiting embodiments, with the understanding that the present disclosure is to be considered an exemplification of the invention and is not intended to limit the invention to the specific embodiments illustrated.

Automated vehicle status features include seat belt buckling reminders, open door reminders, illuminated headlamp reminders, and park brake engagement reminders, among others. Seat belt buckling reminders detect unbuckled seat belts in occupied seats of the vehicle and remind a driver and/or passengers to buckle up with written messages presented via a display and/or audible messages announced via speakers (e.g., a chime, a pre-recorded announcement). Open door reminders similarly detect and remind drivers of unsecured doors, hoods, and/or cargo lids via written and/or or audible messages. Illuminated headlamp reminders similarly detect and remind drivers of lit headlights when the vehicle engine is turned off via written and/or or audible messages. Park brake engagement reminders similarly detect and remind drivers of engaged park brakes when the vehicle is shifted out or "Park" or neutral via written and/or or audible messages.

Law enforcement officers (LEOs) (e.g., police, sheriff, marshals, federal agents, etc.) often store equipment in their issued law enforcement vehicles. In some instances, the equipment is stored a rear hold of the vehicle (e.g., a rear cargo space for a sport utility vehicle, an enclosed trunk for a sedan, etc.). In some instances, the equipment includes weapons (e.g., long guns, rifles, shotguns, etc.) and is stored in a weapons rack mounted in the vehicle. When equipment is stored in a rear hold, the equipment is often not visible to the officer. Thus, the officer must make a visual confirmation that the equipment is present and secured each time he or she enters the vehicle.

In recent years, theft of equipment from law enforcement vehicles has become more frequent. In some instances of theft, the officer may continue on with his or her patrol shift only to discover that the equipment was stolen from the vehicle at end of watch when the officer opens the rear hold to remove the equipment. Where the equipment is a weapon, the whereabouts and possession of a powerful firearm thus become unknown.

In some instances, law enforcement vehicles are "hot seat" transferred from one office to another during a shift change or used by another officer during a shift. In some such instances, the vehicle may not have been equipped with a weapon, but the second officer taking the vehicle from the first officer may erroneously assume the weapon is present in the vehicle. In an emergency, the second officer may need the weapon and only to discover the absence of the weapon in a fraught situation.

This disclosure provides methods and apparatus to facilitate verification of whether equipment assigned to a vehicle, particularly weapons, is present and properly secured in a storage device. By verifying the presence and securement of the equipment, LEOs may be informed that the equipment is available for use when needed, reminded to return the equipment after use, and informed that the equipment is secured against theft.

Figure 2:
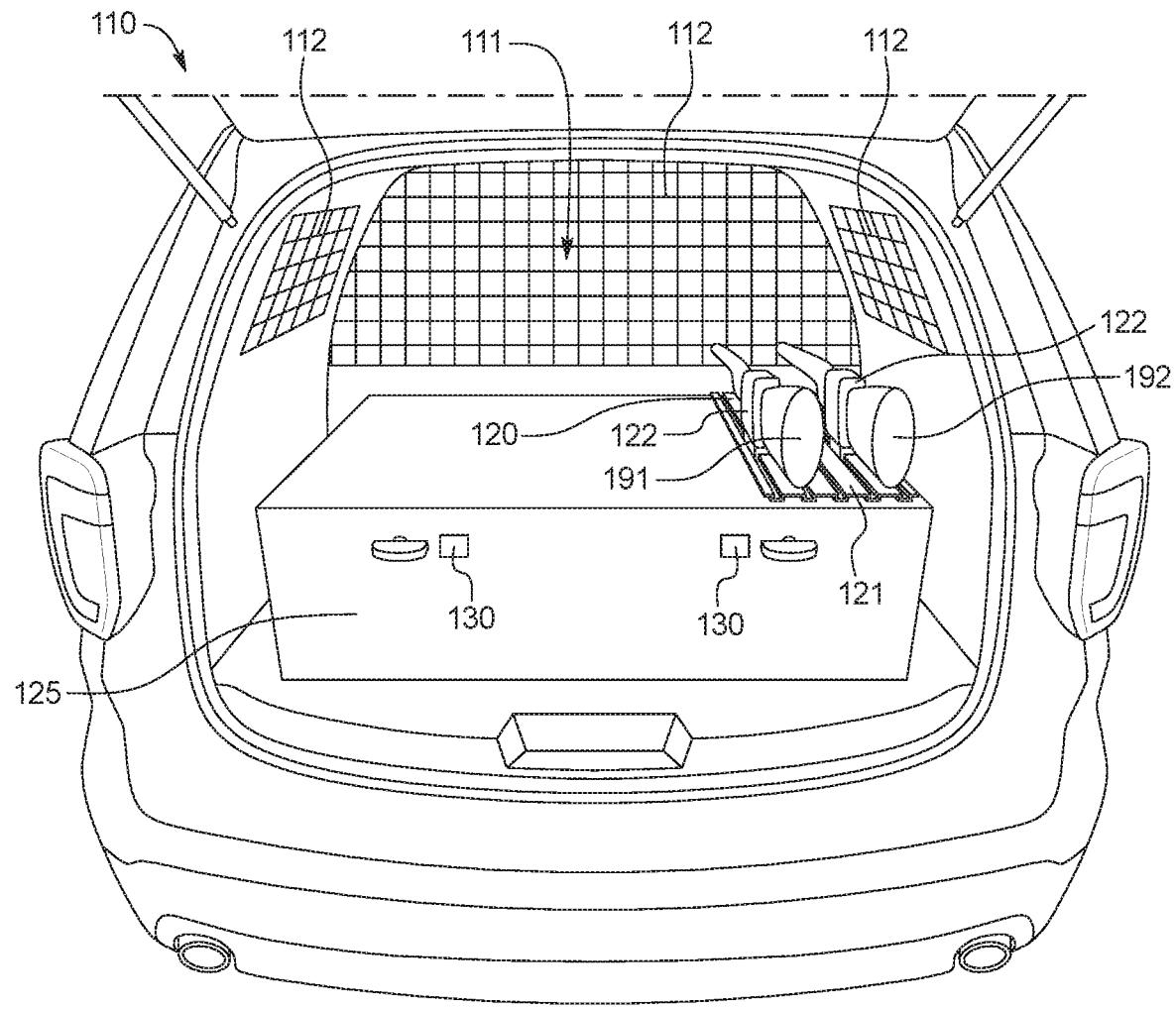
FIG. 2 is a rear view of a cargo space of the vehicle of FIG. 1.
Figure 3:
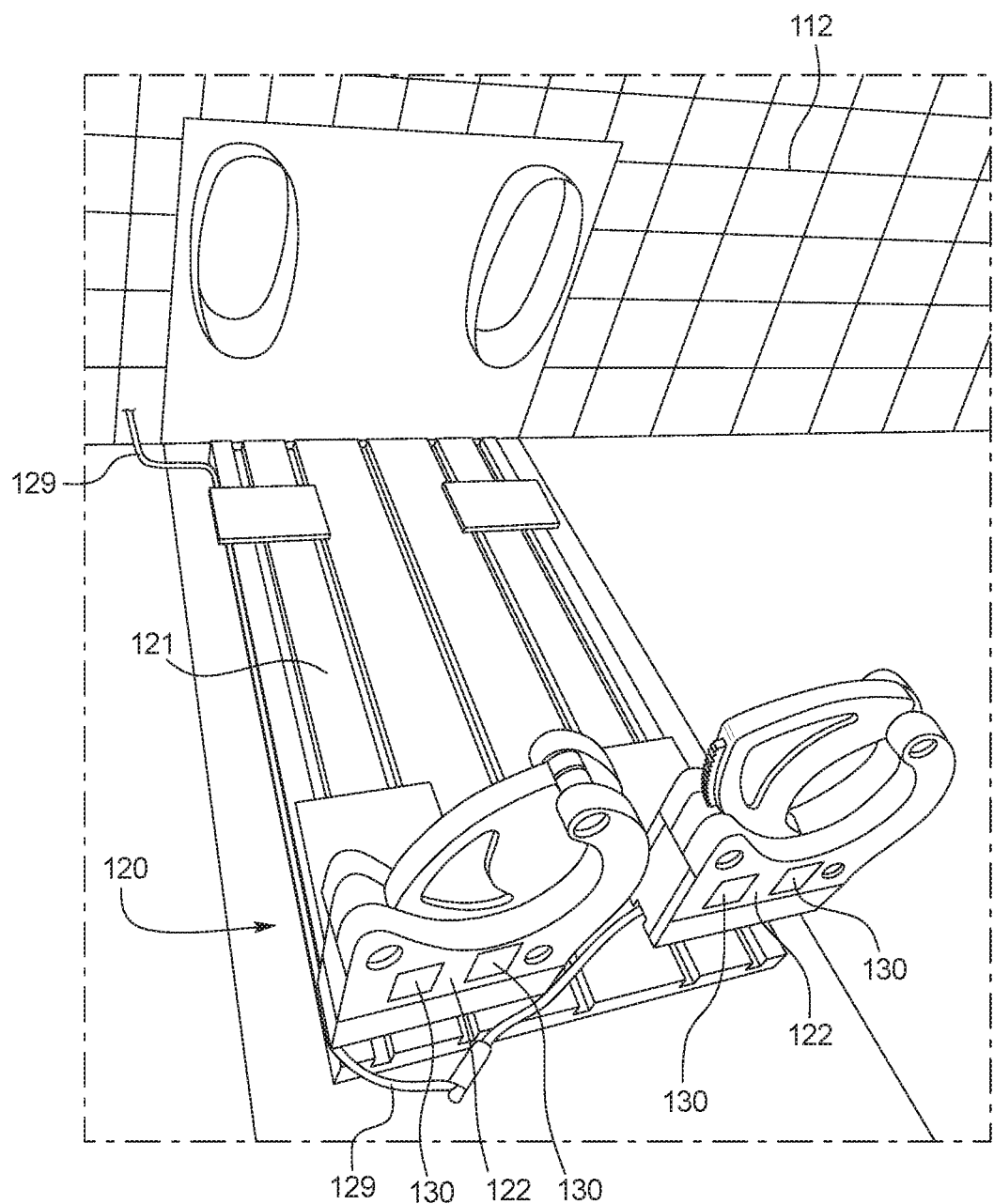
FIG. 3 is a perspective view of an equipment rack of the vehicle of FIG. 1

FIG. 1 is a side schematic view of a vehicle 110 operating in accordance with the teachings of this disclosure in an environment 100. FIG. 2 is a rear view of a cargo space 111 of the vehicle 110. FIG. 3 is a perspective view of an equipment rack 120 of the vehicle 110.

As shown in FIG. 1, the environment 100 includes the vehicle 110, a network 145, a mobile device 170, and a central facility 180. The vehicle 110, the mobile device 170, and the central facility 180 are in communication with one another via the network.

The vehicle 110 may be a standard gasoline powered vehicle, a hybrid vehicle, an electric vehicle, a fuel cell vehicle, and/or any other mobility implement type of vehicle. The vehicle 110 includes parts related to mobility, such as a powertrain with an engine, a transmission, a suspension, a driveshaft, and/or wheels, etc. The vehicle 110 may be non-autonomous, semi-autonomous (e.g., some routine motive functions controlled by the vehicle 110), or autonomous (e.g., motive functions are controlled by the vehicle 110 without direct driver input). As shown in FIGS. 1 and 2, the vehicle 110 includes a security cage 112, an equipment rack 120, sensors 130, an ignition module 135, a transceiver 140, an on board computing platform (OBCP) 150, and an infotainment head unit (IHU) 160.

As shown in FIG. 2, the security cage 112 is disposed in the rear of the vehicle 110 and defines the cargo space 111. In some instances, the security cage 112 is metallic. It should be understood that, in such instances, the security cage 112 may act as a Faraday cage to block radio communications into and out of the cargo space 111 (e.g., for radio frequency identification tag tracking).

The equipment rack 120 is configured to store and secure one or more weapons. In the illustrated example of FIG. 2, the equipment rack 120 stores and secures first and second weapons 191, 192. In the example of FIG. 2, the first weapon 191 is a rifle and the second weapon 192 is a shotgun. The equipment rack 120 includes a base 121, weapon cradles 122, and a wiring harness 129. In some instances, the base 121 is secured to the vehicle 110, as shown in FIG. 3.

The weapon cradles 122 are slidably and removably connected to the base 121 to accommodate and support different types and sizes of weapons. Each of the weapon cradles 122 is configured to lock around a weapon to prevent unauthorized removal of the weapon from the weapon cradle 122. It should be understood that the locks of the weapon cradles 122 may be of any style (e.g., handcuff, clam shell, etc.). In some instances, the first and/or second weapons 191, 192 are respectively assigned specific weapon cradles 122 for storage. In some such instances, the weapon cradles 122 are configured in the base 121 to be compatible with only the type of the assigned weapon. It should be understood that, in some instances, the number of weapon cradles 122 installed in the base 121 may be greater than the number of weapons assigned to the vehicle 110. Thus, in such instances, one or more of the weapon cradles 122 may be unoccupied.

In some instances the wiring harness 129 communicatively connects the equipment rack 120 with the OBCP 150, as will be explained in greater detail below. The wiring harness 129 passes through the security cage 112.

In some instances, the vehicle 110 also includes an equipment vault 125. In some such instances, the equipment rack 120 is mounted in the equipment vault 125.

The sensors 130 may be arranged in and around the vehicle 110 in any suitable fashion. The sensors 130 may be mounted to measure properties around the exterior of the vehicle 110. Additionally, some sensors 130 may be mounted inside the cabin of the vehicle 110 or in the body of the vehicle 110 (such as, the engine compartment, the wheel wells, etc.) to measure properties in the interior of the vehicle 110. For example, such sensors 130 may include accelerometers, odometers, tachometers, pitch and yaw sensors, wheel speed sensors, microphones, tire pressure sensors, and biometric sensors, etc. In the illustrated example, the sensors 130 are object-detecting sensors (e.g., a switch, pressure detector, Hall effect, etc.) and position detecting sensors (e.g., a switch, potentiometer, Hall effect, etc.). The sensors 130 are mounted to, included in, and/or embedded in the weapon cradles 122. The sensors 130 detect objects (e.g., the weapons 191, 192, etc.) in the weapon cradles 122 and whether the weapon cradles 122 are locked. In other words, the sensors 130 generate equipment presence information and securement information for the vehicle 110.

The example ignition module 135 includes circuitry to control starting and stopping of the engine of the vehicle 110 based on a driver cycling a key of the vehicle 110. In some examples, the key is a physical key turned by the driver. In some examples, the key is a fob that transmits encrypted signals to the ignition module. In some examples, the key is a push button. The ignition module 135 detects and records key cycles input by the driver to turn the vehicle on and off.

The example transceiver 140 includes antenna(s), radio(s) and software to broadcast messages and to establish connections between the vehicle 110 and the mobile device 170 and the central facility 180 via the network 145. In some examples, the transceiver 140 is in direct wireless communication with the mobile device 170.

The network 145 includes infrastructure-based modules (e.g., antenna(s), radio(s), etc.), processors, wiring, and software to broadcast messages and to establish connections between the vehicle 110, the central facility 180, and mobile device-based modules, (e.g., the mobile device 170). In some examples, the network 145 is a law enforcement network.

The OBCP 150 controls various subsystems of the vehicle 110. In some examples, the OBCP 150 controls power windows, power locks, an immobilizer system, and/or power mirrors, etc. In some examples, the OBCP 150 includes circuits to, for example, drive relays (e.g., to control wiper fluid, etc.), drive brushed direct current (DC) motors (e.g., to control power seats, power locks, power windows, wipers, etc.), drive stepper motors, and/or drive LEDs, etc. In some examples, the OBCP 150 processes information from the sensors 130 to execute and support automated vehicle reminder features. Using equipment presence information and cradle locking status information provided by the sensors 130, the OBCP 150 determines whether equipment is present in a weapon cradle 122, determines whether the weapon cradles 122 are locked, and generates feedback messages to inform a driver of the equipment presence and securement statuses.

The infotainment head unit 160 provides an interface between the vehicle 110 and a user. The infotainment head unit 160 includes digital and/or analog interfaces (e.g., input devices and output devices) to receive input from the user(s) and display information. The input devices may include, for example, a control knob, an instrument cluster 162 (shown in FIG. 6), a digital camera for image capture and/or visual command recognition, a touch screen, an audio input device (e.g., cabin microphone), buttons, or a touchpad. The output devices may include instrument cluster 162 outputs (e.g., dials, lighting devices), actuators, a heads-up display, a center console display (e.g., a liquid crystal display ("LCD"), an organic light emitting diode ("OLED") display, a flat panel display, a solid state display, etc.), an instrument cluster display 163, and/or speakers. In the illustrated example, the infotainment head unit 160 includes hardware (e.g., a processor or controller, memory, storage, etc.) and software (e.g., an operating system, etc.) for an infotainment system (such as SYNC® and MyFord Touch® by Ford®, Entune® by Toyota®, IntelliLink® by GMC®, etc.). Additionally, the infotainment head unit 160 displays the infotainment system on, for example, the center console display and/or the instrument cluster display 163. A driver may input status inquiry demands to determine what equipment is stored in the equipment rack 120 via the IHU 160.

In some examples, the mobile device 170 is a smartphone. The mobile device 170 may also be, for example, a cellular telephone, a tablet, etc. The mobile device 170 includes a transceiver 172 to send and receive messages from the transceiver 140. The mobile device 170 presents these messages to the driver. The driver may input status inquiry demands to determine what equipment is stored in the equipment rack 120 via the mobile device 170, which transmits the status inquiry demands to the vehicle 110.

In some examples, the central facility 180 is a law enforcement office (e.g., a police station, precinct bureau, etc.). The central facility 180 includes a database 182 of what equipment is assigned to be stored across one or more law enforcement vehicles (e.g., a fleet including the vehicle 110). The central facility sends and receives messages from the transceiver 140 via the network 145. These messages may be presented to law enforcement officers via computer terminals located at the central facility 180.

Figure 4:
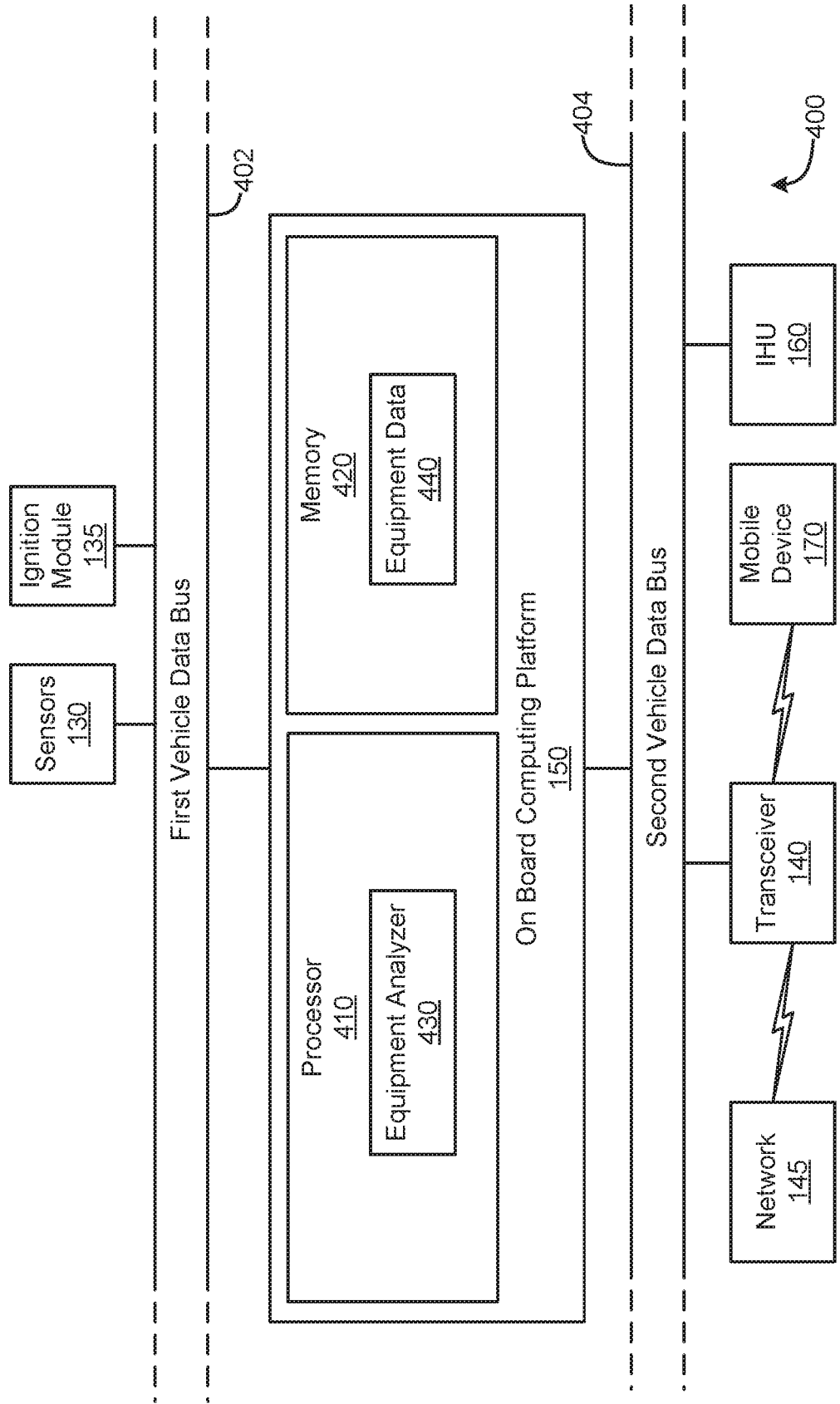
FIG. 4 is a block diagram of the electronic components of the vehicle of FIG. 1.
Figure 5:
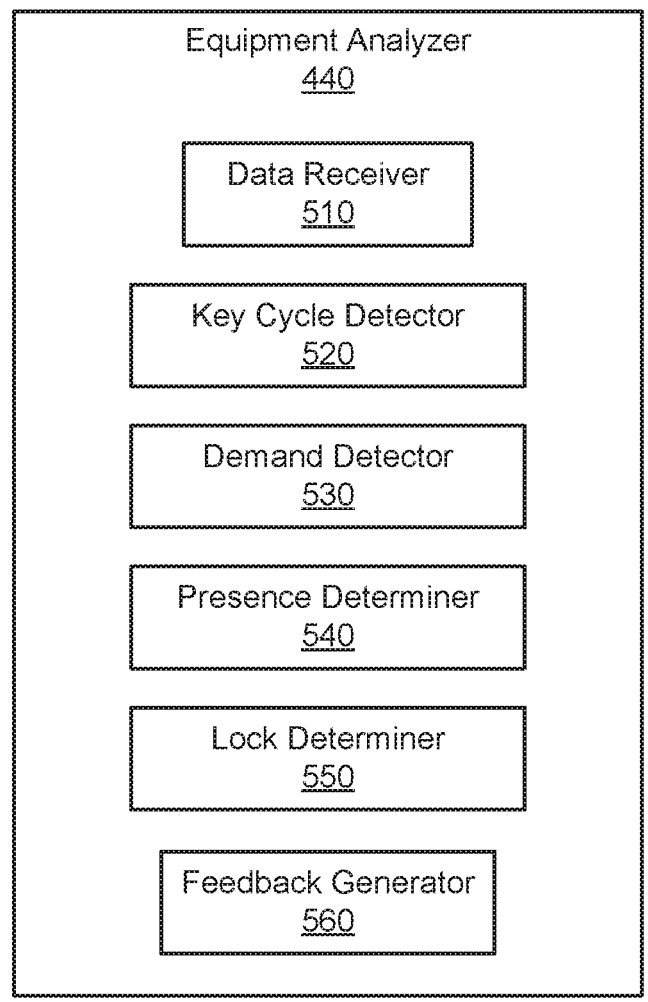
FIG. 5 is a more detailed block diagram of the equipment analyzer of FIG. 4.
Figure 6:
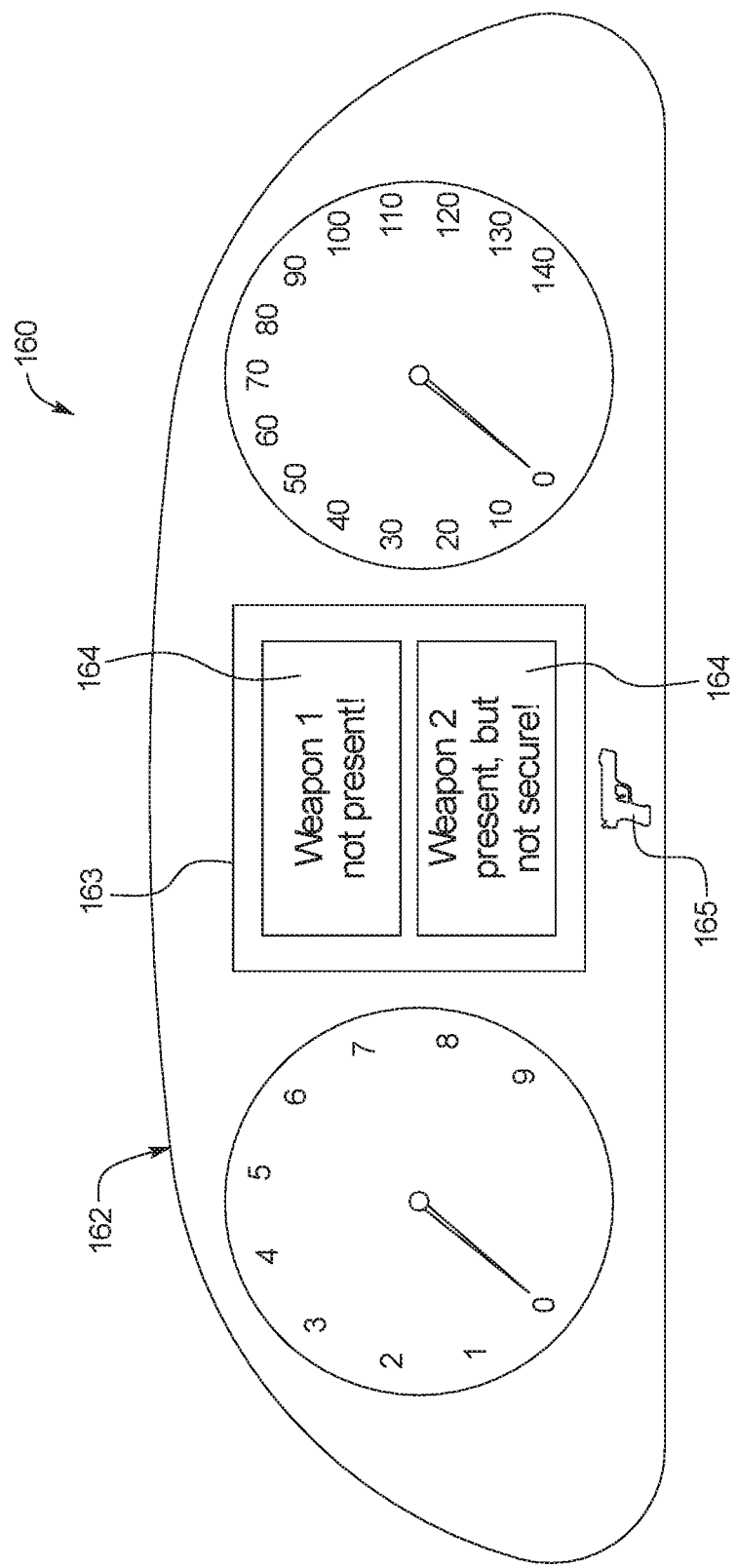
FIG. 6 is a schematic view of an instrument cluster of the vehicle of FIG. 1.
Figure 7:
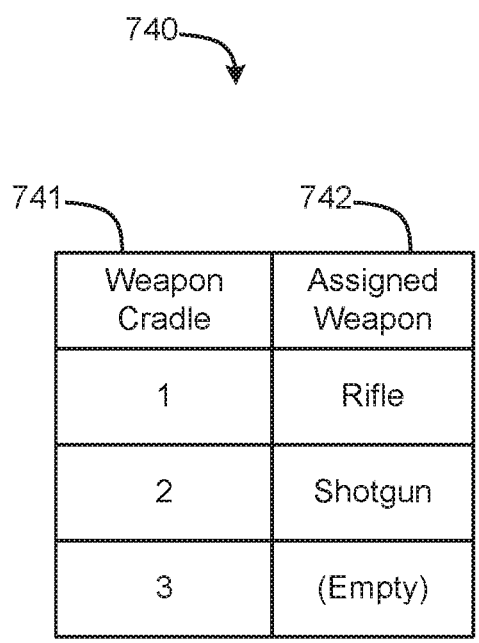
FIG. 7 is a look-up table stored in a memory of the electronic components of FIG. 4.

FIG. 4 is a block diagram of the electronic components 400 of the vehicle 110. FIG. 5 is a more detailed block diagram of the equipment analyzer 430. FIG. 6 is a schematic view of the instrument cluster 162 of the vehicle 110. FIG. 7 is a look-up table 740 stored in a memory 420 of the electronic components 400.

As shown in FIG. 4, the first vehicle data bus 402 communicatively couples the sensors 130, the OBCP 150, and other devices connected to the first vehicle data bus 402. More specifically the sensors 130 are communicatively coupled to the first vehicle data bus 402 via the wiring harness 129. In some examples, the first vehicle data bus 402 is implemented in accordance with the controller area network (CAN) bus protocol as defined by International Standards Organization (ISO) 11898-1. Alternatively, in some examples, the first vehicle data bus 402 may be a Media Oriented Systems Transport (MOST) bus, a CAN flexible data (CAN-FD) bus (ISO 11898-7), or an Ethernet bus. The second vehicle data bus 404 communicatively couples the OBCP 150, the transceiver 140, and the IHU 160. As described above, the transceiver 140 is in wireless communication with the mobile device 170 and/or the network 145. The second vehicle data bus 404 may be a MOST bus, a CAN bus, a CAN-FD bus, or an Ethernet bus. In some examples, the OBCP 150 communicatively isolates the first vehicle data bus 402 and the second vehicle data bus 404 (e.g., via firewalls, message brokers, etc.). Alternatively, in some examples, the first vehicle data bus 402 and the second vehicle data bus 404 are the same data bus.

The OBCP 150 includes a processor or controller 410 and memory 420. In the illustrated example, the OBCP 150 is structured to include the equipment analyzer 430. Alternatively, in some examples, the equipment analyzer 430 may be incorporated into another electronic control unit (ECU) with its own processor 410 and memory 420.

In operation, the equipment analyzer 430 determines whether individual pieces of equipment are present in the equipment rack 120, determines whether the pieces of equipment are secure in the equipment rack 120, and generates messages to present equipment presence and securement statuses to a driver. The equipment analyzer 430 makes these determinations based on equipment presence and cradle locking information from the sensors 130.

The processor or controller 410 may be any suitable processing device or set of processing devices such as, but not limited to: a microprocessor, a microcontroller-based platform, a suitable integrated circuit, one or more field programmable gate arrays (FPGAs), and/or one or more application-specific integrated circuits (ASICs). The memory 420 may be volatile memory (e.g., RAM, which can include non-volatile RAM, magnetic RAM, ferroelectric RAM, and any other suitable forms); non-volatile memory (e.g., disk memory, FLASH memory, EPROMs, EEPROMs, non-volatile solid-state memory, etc.), unalterable memory (e.g., EPROMs), read-only memory, and/or high-capacity storage devices (e.g., hard drives, solid state drives, etc.). In some examples, the memory 420 includes multiple kinds of memory, particularly volatile memory and non-volatile memory.

The memory 420 is computer readable media on which one or more sets of instructions, such as the software for operating the methods of the present disclosure can be embedded. The instructions may embody one or more of the methods or logic as described herein. In a particular embodiment, the instructions may reside completely, or at least partially, within any one or more of the memory 420, the computer readable medium, and/or within the processor 410 during execution of the instructions. The memory 420 stores equipment data 440.

In some examples, the equipment data 440 includes the look up table 740. As shown in FIG. 7, the look up table 740 designates the weapon cradles 122 with identifying numbers 741 and corresponds the weapon cradles 122 to assigned weapons 742. In other words, the look up table 740 provides a list of equipment pieces (e.g., the first and second weapons 191, 192) assigned to the vehicle 110 and where those equipment pieces are to be stored. The equipment data 440 may be updated via the transceiver 140, the IHU 160, and/or an on board diagnostics (OBD) port of the vehicle 110.

The terms "non-transitory computer-readable medium" and "tangible computer-readable medium" should be understood to include a single medium or multiple media, such as a centralized or distributed database, and/or associated caches and servers that store one or more sets of instructions. The terms "non-transitory computer-readable medium" and "tangible computer-readable medium" also include any tangible medium that is capable of storing, encoding or carrying a set of instructions for execution by a processor or that cause a system to perform any one or more of the methods or operations disclosed herein. As used herein, the term "tangible computer readable medium" is expressly defined to include any type of computer readable storage device and/or storage disk and to exclude propagating signals.

As shown in FIG. 5, the equipment analyzer 430 includes a data receiver 510, a key cycle detector 520, a demand detector 530, a presence determiner 540, a lock determiner 550, and a feedback generator 560.

In operation, the data receiver 510 receives object presence and cradle locking information sent by the sensors 130. More specifically, the data receiver 510 receives electrical signals from the sensors 130 indicating whether a piece of equipment is present in a specific weapon cradle 122 and whether that specific weapon cradle 122 is locked. Additionally the data receiver 510 receives key cycle information from the ignition module 135 of the vehicle 110 and equipment rack status demands from the IHU 160, the mobile device 170, and/or the central facility 180. When the key cycle information indicate that the vehicle 110 has been turned on or off, the data receiver 510 prompts the presence determiner 540 and the lock determiner 550. When an equipment rack status is demand, the data receiver 510 prompts the presence determiner 540 and the lock determiner 550.

In operation, the key cycle detector 520 detects whether the key of the vehicle 110 has been cycled to turn the vehicle 110 from off to on and vice versa. More specifically, the key cycle detector 520 analyzes the key cycle information received by the data receiver 510 from the ignition module 135 to determine whether a run state (e.g., on, off) of the vehicle 110 has changed.

In operation, the demand detector 530 detects status inquiry demands received by the data receiver 510 from the IHU 160, the mobile device 170, and/or the central facility 180 via the transceiver 140. In other words, the demand detector 530 determines whether a driver or other officer has sent and/or input an equipment rack status inquiry demand to the vehicle 110.

In operation, the presence determiner 530, determines whether pieces of equipment are present in their assigned weapon cradles 122. More specifically, in response to a detected key cycle from the key cycle detector 520 and/or a detected status inquiry demand for the demand detector 530, the presence determiner 540 accesses the equipment data 440 stored in the memory 420 and compares the object presence information signals from the object-sensing sensors 130 connected to each of the weapon cradles 122 to the equipment data 440. In other words, the presence determiner 530 determines a presence status for equipment assigned to the equipment rack 120.

If the equipment data 440 show that a piece of equipment is assigned to a weapon cradle 122, and the signals from the object-sensing sensor 130 of that weapon cradle 122 indicate that the weapon cradle 122 is occupied, the presence determiner 540 determines that the equipment piece is present.

If the equipment data 440 show that a piece of equipment is assigned to a weapon cradle 122, but the signals from the object-sensing sensor 130 of that weapon cradle 122 indicate that the weapon cradle 122 is empty, the presence determiner 540 determines that the equipment piece is missing.

If the equipment data 440 show that no equipment is assigned to a weapon cradle 122, but the signals from the object-sensing sensor 130 of that weapon cradle 122 indicate that the weapon cradle 122 is occupied, the presence determiner 540 determines that the equipment piece is misplaced.

In operation, the a lock determiner 550 determines whether equipment-occupied weapon cradles 122 and/or equipment vault 125 are locked. More specifically, the lock determiner 550 analyzes lock position information signals from the position-sensing sensors 130 connected to the locks of the weapon cradles 122 and/or equipment vault 125. In other words, the lock determiner 550 determines a securement status for equipment stored in the equipment rack 120.

If the signals from the position-sensing sensors 130 of that weapon cradles 122 indicate that the weapon cradles 122 are closed, the lock determiner 550 determines that the weapon cradles 122 are locked.

If the signals from the position-sensing sensors 130 of that weapon cradles 122 indicate that the weapon cradles 122 are ajar (e.g., open, not fully closed, etc.), the lock determiner 550 determines that the weapon cradles 122 are unlocked.

In operation the feedback generator 560 generates feedback based on the equipment presence and locking status determinations from the presence determiner 540 and the lock determiner 550. More specifically, the feedback generator 560 generates audio messages, visual messages 164, and/or a status icon 165 regarding the presence and securement statuses of the equipment pieces assigned to the vehicle 110, as shown in FIG. 6. The messages 164 may be warnings that a piece of equipment is missing, that a piece of equipment is misplaced in the equipment rack 120, that one or more weapon cradles 122 is unlocked, etc. The messages 164 may also be reports that all the equipment assigned to the vehicle 110 is stored correctly and secured in the equipment rack 120. The status icon 165 changes color (e.g., from green to yellow and vice versa) based on the presence and securement statuses of the equipment pieces assigned to the vehicle 110. Further, the feedback generator 560 sends the messages 164 and/or the status icon 165 for display via the IHU 160, the mobile device 170, and/or the central facility 180. In some examples, the messages 164 and/or the status icon 165 are displayed on the instrument cluster display 163.

Figure 8:
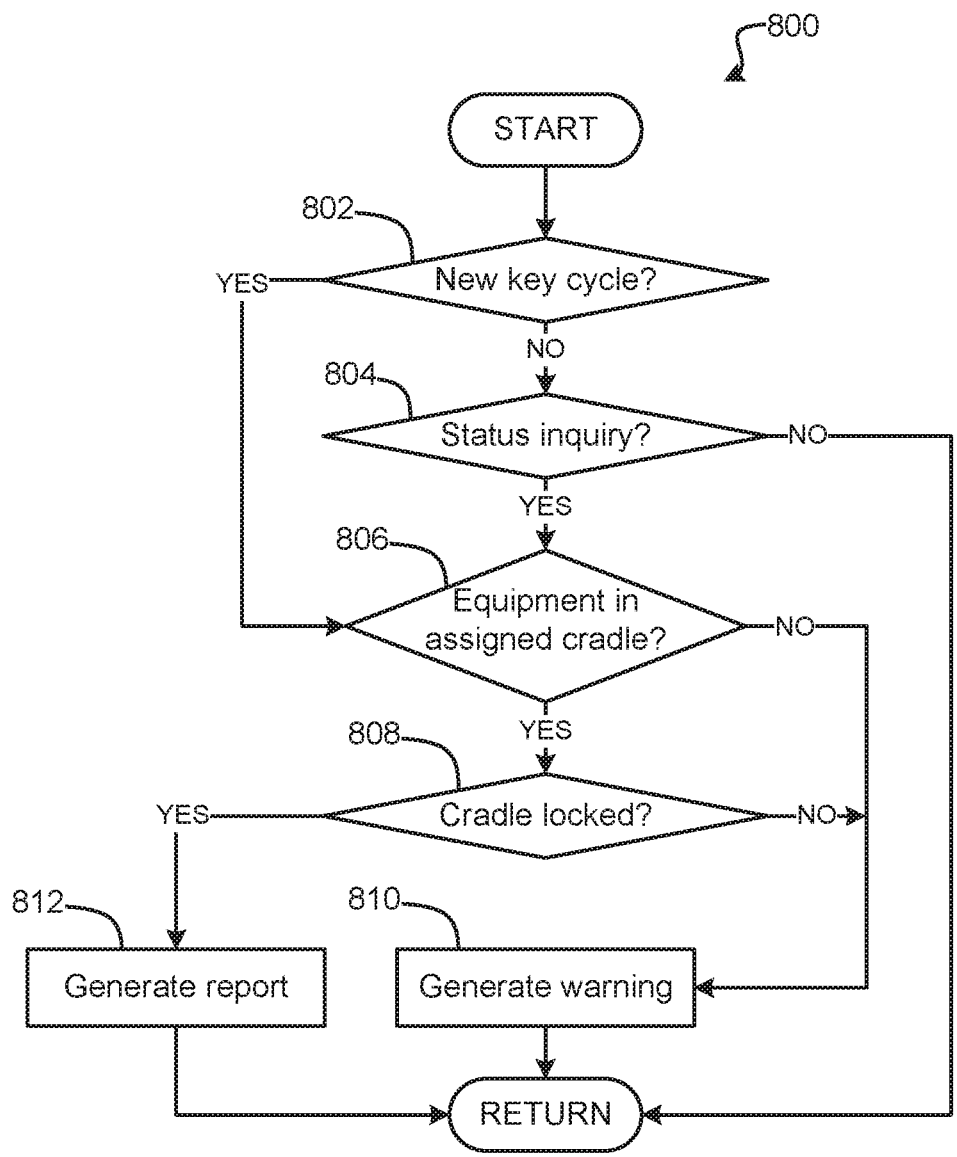
FIG. 8 is a flowchart of a method to verify the statuses of equipment to be stored in the equipment rack of FIGS. 1-3, which may be implemented by the electronic components of FIG. 4.

FIG. 8 is a flowchart of a method 800 to verify the statuses of equipment to be stored in the equipment rack of FIGS. 1-3, which may be implemented by the electronic components of FIG. 4. The flowchart of FIG. 8 is representative of machine readable instructions stored in memory (such as the memory 420 of FIG. 4) that comprise one or more programs that, when executed by a processor (such as the processor 410 of FIG. 4), cause the vehicle 110 to implement the example equipment analyzer 430 of FIGS. 4 and 5. Further, although the example program(s) is/are described with reference to the flowchart illustrated in FIG. 8, many other methods of implementing the equipment analyzer 430 may alternatively be used. For example, the order of execution of the blocks may be changed, and/or some of the blocks described may be changed, eliminated, or combined.

Initially, at block 802, the key cycle detector 520 detects whether a key of the vehicle has been cycled to turn the vehicle 110 on or off. As discussed above, the key cycle detector 520 determines whether the key has been cycled based on signals from the ignition module 135 of the vehicle 110.

If, at block 802, the key cycle detector 520 detects that the key of the vehicle has been cycled to turn the vehicle 110 on or off, the method 800 proceeds to block 804.

If, at block 802, the key cycle detector 520 detects that the key of the vehicle has not been cycled to turn the vehicle 110 on or off, the method 800 proceeds to block 806.

At block 804, the demand detector 530 detects whether an officer has input an equipment rack status inquiry demand to the vehicle 110. More specifically, the demand detector 530 communicates with the IHU 160, the mobile device 170, and/or the transceiver 140, as discussed above.

If, at block 804, the demand detector 530 detects that an officer has input an equipment rack status inquiry demand to the vehicle 110, the method 800 proceeds to block 806.

If, at block 804, the demand detector 530 detects that an officer has not input an equipment rack status inquiry demand to the vehicle 110, the method 800 returns to block 802.

At block 806, the presence determiner 540 determines whether the equipment pieces assigned to the vehicle 110 are present in their respective weapon cradles 122. More specifically, the presence determiner 540 compares object presence information signals from object-sensing sensors 130 to equipment data 440 accesses from the memory 420, as discussed above.

If, at block 806, the presence determiner 540 determines that the equipment pieces assigned to the vehicle 110 are not present in their respective weapon cradles 122, the method 800 proceeds to block 810.

If, at block 806, the presence determiner 540 determines that the equipment pieces assigned to the vehicle 110 are present in their respective weapon cradles 122, the method 800 proceeds to block 808.

At block 808, the lock determiner 550 determines whether the weapon cradles 122 and/or equipment vault 125 are locked. More specifically, the lock determiner 550 analyzes lock position signals from the position-sensing sensors 130 of the locks of the weapon cradles 122 and/or equipment vault 125, as discussed above.

If, at block 808, the lock determiner 550 determines that the weapon cradles 122 and/or equipment vault 125 are locked, the method 800 proceeds to block 812.

If, at block 808, the lock determiner 550 determines that the weapon cradles 122 and/or equipment vault 125 are not locked, the method 800 proceeds to block 810.

At block 810, the feedback generator 560 relays messages 164 and/or updates the color of status icon 165 warning the officer(s) that the equipment pieces are missing, misplaced, and/or unsecure. More specifically, the feedback generator 560 announces audio messages and/or displays visual messages via the IHU 160, the mobile device 170, and/or the central facility 180, as discussed above. The method then returns to block 802.

At block 812, the feedback generator 560 relays messages 164 and/or updates the color of status icon 165 reporting to the officer(s) that the equipment pieces are present and secure in the equipment rack 120. More specifically, the feedback generator 560 announces audio messages and/or displays visual messages via the IHU 160, the mobile device 170, and/or the central facility 180, as discussed above. The method then returns to block 802.

In this application, the use of the disjunctive is intended to include the conjunctive. The use of definite or indefinite articles is not intended to indicate cardinality. In particular, a reference to "the" object or "a" and "an" object is intended to denote also one of a possible plurality of such objects. Further, the conjunction "or" may be used to convey features that are simultaneously present instead of mutually exclusive alternatives. In other words, the conjunction "or" should be understood to include "and/or". The terms "includes," "including," and "include" are inclusive and have the same scope as "comprises," "comprising," and "comprise" respectively.

From the foregoing, it should be appreciated that the above disclosed apparatus and methods may aid law enforcement officers by reminding officers when weapons and/or other equipment assigned to a patrol vehicle is missing, misplaced, and/or unsecured. By reminding officers of missing, misplaced, and/or unsecured equipment, officers may be prompted to properly equip their patrol vehicles before departing on patrol, secure weapons, and collect equipment used in field. Thus, equipment presence and securement reminder may prevent loss, theft, and/or misplacement of equipment. Additionally, the above disclosed apparatus and methods may aid law enforcement officers by providing officers on-demand presence and securement status reports of equipment stored in patrol vehicles. Thus officers may be provided some peace of mind that their patrol vehicles are properly equipped and the equipment therein is secure. It should also be appreciated that the disclosed apparatus and methods provide a specific solution—providing officers presence and securement status reports of equipment—to a specific problem—potential loss, theft, and/or omission of required equipment from a patrol vehicle. Further, the disclosed apparatus and methods provide an improvement to computer-related technology by increasing functionality of a processor to determine whether objects are present in designated spots and whether the spots are secured against unauthorized removal of the objects.

As used here, the terms "module" and "unit" refer to hardware with circuitry to provide communication, control and/or monitoring capabilities, often in conjunction with sensors. "Modules" and "units" may also include firmware that executes on the circuitry.

The above-described embodiments, and particularly any "preferred" embodiments, are possible examples of implementations and merely set forth for a clear understanding of the principles of the invention. Many variations and modifications may be made to the above-described embodiment(s) without substantially departing from the spirit and principles of the techniques described herein. All modifications are intended to be included herein within the scope of this disclosure and protected by the following claims.

What is claimed is:

1. A vehicle comprising:
   an equipment rack including sensors to generate presence and securement information;
   a processor and memory in communication with the sensors and configured to:
   determine a presence status of an object assigned to the equipment rack using the presence information;
   determine a securement status of the object in the equipment rack using the securement information; and
   display a report of the presence and securement statuses via a display; and
   an ignition module in communication with the processor, wherein the processor is configured to detect a key cycle based on key cycle information from the ignition module.

2. The vehicle of claim 1, further comprising an infotainment head unit (IHU), wherein the display is included in the IHU.

3. The vehicle of claim 1, further comprising a transceiver, wherein the processor is configured to transmit the report to at least one of a mobile device or a central facility via the transceiver.

4. The vehicle of claim 1, further comprising
a transceiver in communication with one or more of a mobile device and a central facility; and
an infotainment head unit (IHU);
wherein the processor is configured to receive one or more status inquiry demands from one or more of the IHU, the mobile device, and the central facility.

5. The vehicle of claim 4, wherein the processor is configured to determine the presence and securement statuses in response to receiving the status inquiry demand.

6. The vehicle of claim 1, wherein the processor is configured to determine the presence and securement statuses in response to detecting the key cycle.

7. The vehicle of claim 1, wherein the equipment rack is configured to store and secure one or more weapons.

8. A method comprising:
detecting, with the processor, a key cycle based on key cycle information from an ignition module of a vehicle;
determining, with a processor, a presence status of an object assigned to an equipment rack using presence information from sensors;
determining, with the processor, a securement status of the object in the equipment rack using securement information from the sensors; and
displaying, with a display, a report of the presence and securement statuses.

9. The method of claim 8, wherein the display is included in an infotainment head unit (IHU) of a vehicle.

10. The method of claim 8, further comprising transmitting, with a transceiver, the report to at least one of a mobile device or a central facility.

11. The method of claim 8, further comprising receiving, with the processor, one or more status inquiry demands from one or more of an infotainment head unit, a mobile device, or a central facility.

12. The method of claim 11, wherein determining the presence and securement statuses is in response to receiving the status inquiry demand.

13. The method of claim 8, wherein determining the presence and securement statuses is in response to detecting the key cycle.

14. The method of claim 8, wherein the equipment rack is configured to store and secure one or more weapons.

* * * * *